United States Patent
Schoenmeyer et al.

(10) Patent No.: US 8,699,769 B2
(45) Date of Patent: Apr. 15, 2014

(54) GENERATING ARTIFICIAL HYPERSPECTRAL IMAGES USING CORRELATED ANALYSIS OF CO-REGISTERED IMAGES

(75) Inventors: Ralf Schoenmeyer, Garching (DE); Peter Ellenberg, Munich (DE); Gerd Binnig, Kottgeisering (DE); Maria Athelogou, Munich (DE); Guenter Schmidt, Munich (DE)

(73) Assignee: Definiens AG, Munich (DE)

( * ) Notice: Subject to any disclaimer, the term of this patent is extended or adjusted under 35 U.S.C. 154(b) by 155 days.

(21) Appl. No.: 13/546,182

(22) Filed: Jul. 11, 2012

(65) Prior Publication Data
US 2013/0016886 A1 Jan. 17, 2013

Related U.S. Application Data

(60) Provisional application No. 61/572,221, filed on Jul. 12, 2011.

(51) Int. Cl.
*G06K 9/00* (2006.01)
*G06T 7/00* (2006.01)

(52) U.S. Cl.
CPC .................................. *G06T 7/0012* (2013.01)
USPC ....................................................... 382/128

(58) Field of Classification Search
None
See application file for complete search history.

(56) References Cited

U.S. PATENT DOCUMENTS

2005/0190955 A1 9/2005 Brown .......................... 382/128
2008/0144013 A1* 6/2008 Lanoue et al. ................... 356/73
2010/0215227 A1* 8/2010 Grunkin et al. ............... 382/128
2010/0265267 A1 10/2010 Schaepe et al. ............... 345/619

FOREIGN PATENT DOCUMENTS

WO WO2008/080403 1/2007

OTHER PUBLICATIONS

Athelogou et al., "Kontextbasierte Bildanalyse mit Cognition Networks," Biospektrum, Jun. 1, 2007 pp. 657-659 XP055056406 (3 pages).
Baum et al., "Investigation of PET/MRI image fusion schemes for enhanced breast cancer diagnosis," IEEE Nuclear Science Symposium Conference Record, Oct. 1, 2007 pp. 3774-3780 XP031206429 (7 pages).
Extended European Search Report dated Apr. 2, 2013 in European patent application 12176077.1 (published as EP2546802) (9 pages).

* cited by examiner

*Primary Examiner* — Amara Abdi
(74) *Attorney, Agent, or Firm* — Imperium Patent Works; Darien K. Wallace

(57) ABSTRACT

High-resolution digital images of adjacent slices of a tissue sample are acquired, and tiles are defined in the images. Values associated with image objects detected in each tile are calculated. The tiles in adjacent images are co-registered. A first hyperspectral image is generated using a first image, and a second hyperspectral image is generated using a second image. A first pixel of the first hyperspectral image has a first pixel value corresponding to a local value obtained using image analysis on a tile in the first image. A second pixel of the second hyperspectral image has a second pixel value corresponding to a local value calculated from a tile in the second image. A third hyperspectral image is generated by combining the first and second hyperspectral images. The third hyperspectral image is then displayed on a computer monitor using a false-color encoding generated using the first and second pixel values.

21 Claims, 14 Drawing Sheets

GENERATING ARTIFICIAL HYPERSPECTRAL IMAGES USING CORRELATED ANALYSIS OF CO-REGISTERED IMAGES

CROSS REFERENCE TO RELATED APPLICATIONS

This application claims the benefit under 35 U.S.C. §119 of provisional application Ser. No. 61/572,221, entitled "Generating Artificial Hyper-Spectral Images by Co-Analysis of Co-Registered Images", filed on Jul. 12, 2011. The subject matter of provisional application Ser. No. 61/572,221 is incorporated herein by reference.

TECHNICAL FIELD

The present invention relates to generating artificial hyperspectral images from co-registered tissue slices, which enables sophisticated co-analyses of image stacks.

BACKGROUND

A method for generating artificial hyperspectral images can be performed by transforming a new problem into an old one that has already been solved. The problem of how to extract valuable information from co-registered tissue slices can be solved by transforming this problem into an image analysis problem that can be performed with existing techniques. The new problem concerns how to correlate local object-based image analysis results from different tissue slices taken from the same tissue of a given patient. The correlated analysis (co-analysis) results in a much higher quality of the medical evaluation than what a "slide-after-slide analysis" could provide.

A method is sought for extracting valuable information from many high resolution images of adjacent tissue slices that reduces the computing resources required to analyze the large amount of information associated with any particular x-y position in co-registered images.

SUMMARY

An artificial hyper-spectral image is generated from co-registered tissue slides and enables the sophisticated co-analysis of image stacks. Co-registration is performed on tiles of high-resolution images of tissue slices, and image-object statistics are used to generate pixels of a down-scaled hyper-spectral image. The method of analyzing digital images to generate hyperspectral images combines two hyperspectral images to generate a third hyperspectral image.

Digital images of adjacent slices of a tissue sample are first acquired, and first and second tiles of first and second digital images are defined. A first value associated with image objects detected in the first tile is calculated, and a second value associated with image objects detected in the second tile is calculated. The first tile is co-registered with the second tile using the image objects in the first tile and the image objects in the second tile. A first hyperspectral image is generated using the first digital image, and a second hyperspectral image is generated using the second digital image. A first pixel of the first hyperspectral image has a first pixel value and a first pixel location. The first pixel value corresponds to the first value, and the first pixel location in the first hyperspectral image corresponds to the position of the first tile in the first digital image. A second pixel of the second hyperspectral image has a second pixel value corresponding to the second value and a second pixel location corresponding to the position of the second tile. The third hyperspectral image is generated by combining the first and second hyperspectral images.

Image analysis is used to generate image objects by segmenting the third hyperspectral image. Values of properties of the image objects of the third hyperspectral image are determined, and the values are stored in non-volatile memory. The third hyperspectral image is then displayed on a computer monitor using a false-color encoding of the first and second pixel values.

The first value can be calculated using a factor, such as a mean, a median, a minimum, a maximum, a quantile, or a standard deviation of a property of a subset of the image objects detected in the first tile. For example, the first value is calculated using a distance weighted mean of a property of the subset of image objects detected in the first tile, and the distance weighted mean is based on distances from a center of the first tile to a center of each of the image objects in the subset. Where the tissue sample is taken from a patient with cancer, the probability of recurrence of the cancer can be determined based on the first value. A therapy response for the patient can also be generated based on the first value. The first value can also be calculated using the property of those image objects detected in tiles adjacent to the first tile. For example, the subset of the image objects detected in the first tile are those image objects classified as nuclei of tumor cells, and the property is an intensity of staining of the subset of the image objects.

In one embodiment, the tiles are not co-registered with one another, but rather the first hyperspectral image is co-registered with the second hyperspectral image.

In another embodiment, the first slice is stained with a first biomarker, and the first value corresponds to a histopathological score of the first biomarker. The second slice is stained with a second biomarker, and the second value corresponds to a histopathological score of the second biomarker. The false-color encoding of the third hyperspectral image is based on the difference between the first value and the second value. The third hyperspectral image thereby depicts the heterogeneity of a tumor in the tissue sample. For example, the first slice is stained with an H&E biomarker, and the first value corresponds to the number of mitotic objects in the first tile that are stained by the H&E biomarker. Alternatively, the first slice is immunohistochemically (IHC) stained using a progesterone receptor antibody, and the first value corresponds to a first Allred score. The second slice is immunohistochemically (IHC) stained using an estrogen receptor antibody, and the second value corresponds to a second Allred score. Alternatively, the second slice is processed with in-situ hybridization, and the second value indicates gene amplification.

In yet another embodiment, when the user selects a pixel of the third hyperspectral image, a tile of the first digital image that corresponds to the selected pixel of the third hyperspectral image is displayed on the computer monitor. The pixel value can be displayed next to the tile as a numerical value or as part of a bar chart. Similarly, when the user selects the first tile of the first digital image, the corresponding pixel of the third hyperspectral image is highlighted on the computer monitor.

In yet another embodiment, both the full-resolution first digital image and the combined third hyperspectral image are simultaneously displayed on the computer monitor. The tile is outlined on the full-resolution image as the user moves the tip of the cursor arrow over the corresponding pixel of the combined hyperspectral image. A biomarker score value for the tile is displayed next to the tile. As the user points the cursor to a different pixel of the combined hyperspectral image, the tile outline in the full-resolution image moves to the corresponding tile, and the biomarker score value changes to reflect the results of the image analysis at the new tile. The user can navigate to the most critical tiles in the full-resolution first digital image by looking for a particular color of pixels in the combined third hyperspectral image.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
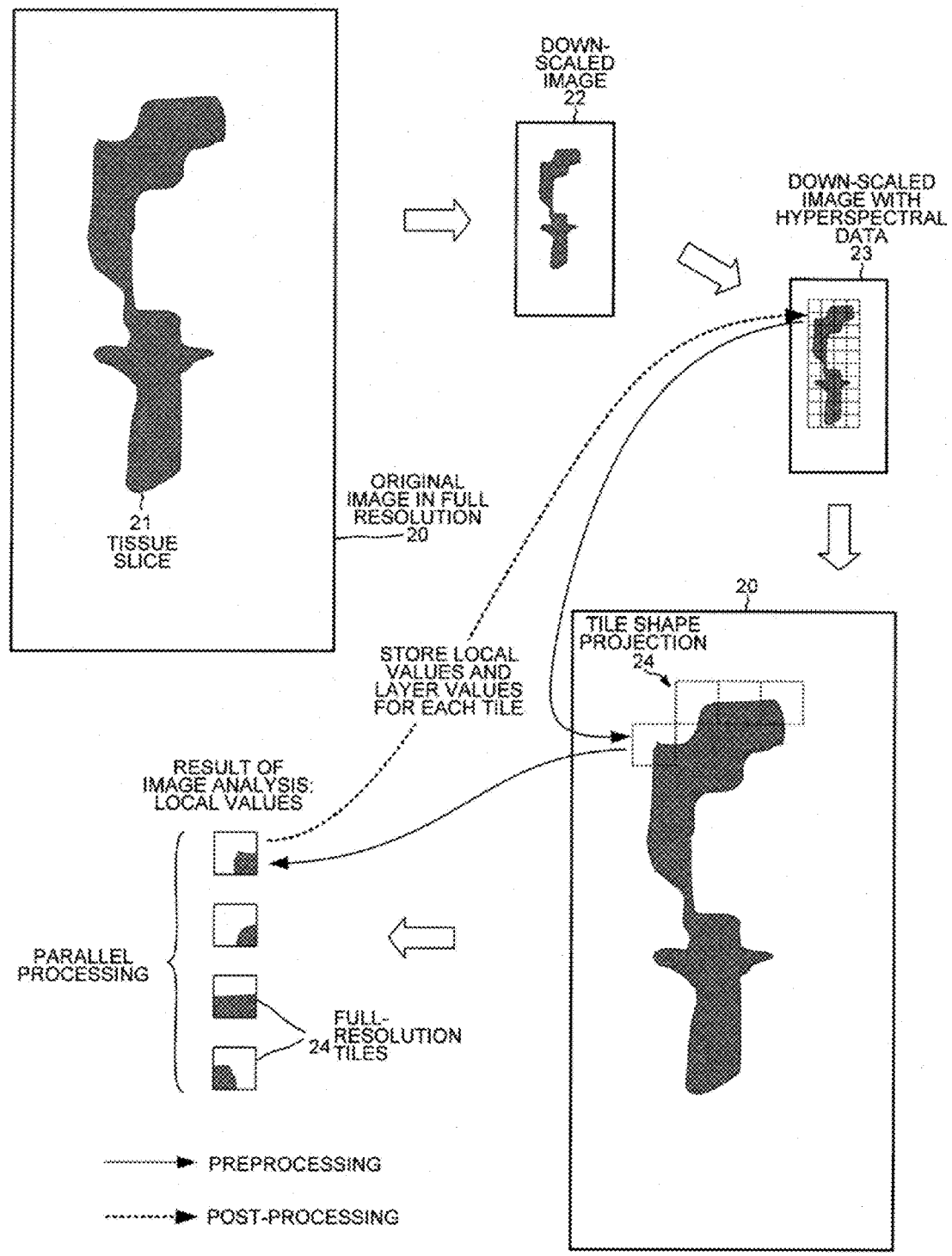
FIG. 1 is a diagram illustrating the production and processing of high-resolution tiles from a master image of a tissue slice.

Reference will now be made in detail to some embodiments of the invention, examples of which are illustrated in the accompanying drawings.

A correlated image analysis is performed on different tissue slices that are stained differently and that thus carry different kinds of information. If the different slices are taken from the tissue in a way that the spacing between the slices is small, it is possible to co-register the slices. The type of tissue that is visible at the same x-y position in adjacent slices might be very similar. In particular, a cancer region in one slice might be visible in a similar way in adjacent slices. When those slices are co-registered, in each x-y position of the slices a feature vector with N features is extracted using image analysis. In order to simplify explaining the principles behind the method, we assume that the number of features is the same for each of the slices. However, the number of features extracted from different slices could be different, and also different features could be extracted from different slices. The features make up a fingerprint of the local tissue properties. If n slices are now co-registered, for each x-y position the N different feature vectors are combined into a new feature vector with n*N features. The combined tissue fingerprint with n*N features for each x-y position is much more meaningful than the sum of the fingerprints of individual tissue slices. In particular, heterogeneity of tumors can be detected with higher precision based on the n*N features for each x-y position of the tissue slices. In an individual slice, different cancer regions might appear in a very similar manner. In a second individual slice, those different cancer regions also might look very similar. In a combined analysis, however, a strong heterogeneity might become evident because highlighted cancer regions might appear at different x-y locations for different stains.

The new problem of how to extract valuable information from co-registered tissue slices is not trivial because a pixel-by-pixel co-analysis of multiple co-registered slices results in an extremely complex analysis that is very difficult to execute if all of the complex properties in the different slices are taken into account. Moreover, is only properties of pixels as opposed to properties of segmented objects are used in the image analysis, the most important and interesting features are lost. The new multi-slice analysis method solves this problem in an efficient way with high quality results by reducing the complexity of the comprehensive multi-slice image analysis without losing relevant information.

The novel method builds upon existing high-quality context-driven image analysis, such as the analysis performed by the Cognition Network Technology (CNT) of Definiens AG. The more complex the images are, the more difficult the image analysis becomes. At the same time, however, the information extracted can be extremely valuable for complex images, such as images of H&E stained slices.

The n different slices are segmented, preferable into square tiles. The tiles then represent smaller regions of downscaled images, down to the size of a pixel. When combined, the downscaled regions form a new image of a much smaller size but with multiple image layers as opposed to the single layer of the original tiled image. The downscaled image with multiple image layers is referred to as a hyperspectral image. Information contained in the n slices is thus compressed into one smaller image with many layers. The values within the different layers of the hyperspectral image are generated by statistical analysis of the results from image analysis on the tiles of the different slices.

The results of the image analysis can be represented in multiple ways. The results can be represented in an object-oriented format in which multiple associated pixels are replaced by an object representing those pixels in each of the different layers. For each of the layers, there are different local values associated with a co-registered object. In the Definiens Cognition Network Language (CNL), a Definiens proprietary scripting language for implementing data analysis transforms the image layers into the local values associated with the image objects. The local values can also be transformed vice versa back into the image layers. The objects could have a size even down to the size of a single pixel. As both representations are equivalent, we concentrate here only on the description of layers. Below, the storage of feature vectors into local values is discussed. In another representation, the statistical analysis results for each tile and each feature vector are stored in a table or database together with the associated x-y location of the tile from which the feature vector was created. This table can be transformed into layer values or local values in the hyperspectral image. Thus, the hyperspectral image can be created using the values in the table because the locations of the pixels and of the corresponding hyperspectral layers are defined within the table.

The tiles are co-registered either because the slices were co-registered beforehand or a transformation formula has been worked out that is applied to define in which position and with what rotation angle and scale the tiles are cut from the full slices. The n different slices are assessed by analyzing all the tiles taken from the slices. The analysis of different tiles can be performed in parallel on many computing nodes, thus enabling an efficient way to speed up the processing. Rich minable data is retrieved by detecting and classifying objects within the tiles at high resolution. Object properties of certain object classes and properties of relations between image objects of certain classes are calculated and stored in tables, local values of objects, or in the form of layer values in image layers.

The transformation of the local values associated with the image objects into the image layers generates a hyperspectral image by co-analysis of the co-registered image slices. A final image analysis is then executed on the small hyperspectral image. This final image analysis is performed following the same principles as applied for the image analysis of the digital images of the tissue slices. Preferably the analysis is performed using the Cognition Network Technology (CNT) of Definiens AG to extract very rich information. Pixels or tiles with similar feature vectors or layer values are combined into objects. Objects that conform to class descriptions are classified through context and knowledge driven image analysis. Hierarchical objects are also created. As a final comprehensive result, the object and hierarchical relation properties of the image objects are measured, exported and stored in a storage medium in the form of feature vectors. This final feature vector represents a tissue-based fingerprint of the health state of the patient that is much more advanced, sophisticated and valuable than the sum of all image analysis results of the different slices. This type of analysis allows the heterogeneity of tissue to be evaluated, in particular the heterogeneity of tumors. This heterogeneity can be investigated with a high precision in a simple manner because the local hyperspectral information is represented in a compressed form suited for normal advanced image processing.

The hyperspectral images generated by co-analysis of co-registered image slices can be used in the field of digital pathology. In digital pathology, digital images of tissue slices that have the required high spectral resolution have huge image sizes of several Giga-pixels. Because sophisticated image analysis tasks can be performed only on a limited amount of data at one time, an efficient data handling is essential. While basic pixel processing can be performed on images of complete slices at low resolution, more complex image analysis functions are no longer employed on images at a high resolution that a pathologist could visually evaluate. In order to analyze a high resolution image, either the complex analysis functions are performed only on low-resolution sampled portions of the image, or the high resolution image is subdivided into regions (here called tiles) and each region is processed separately. The novel method of performing correlated analysis of co-registered images combines both approaches.

The method makes information available in a low-resolution multispectral version of the analyzed image that would otherwise be available only in a high resolution image. In the context of digital pathology, "high resolution" means that sub-compartments of cells are clearly visible in the images of the slices. The method allows for the collection of information from several related images (co-registered tiles) and for the parallel processing of the tiles.

The method analyzes a set of high-resolution images of consecutive, adjacent tissue slices from a patient that are obtained from differently stained tissue slices cut from the same tissue sample. Additionally, a coordinate transformation is performed that converts corresponding positions from each slice to the coordinates of the other slices. In a first embodiment, an affine transformation is used that is derived from the positions of three corresponding landmarks in each slice. The landmarks are set manually. Given a set of three points P1A, P2A and P3A in an image A and three points P1B, P2B and P3B in an image B, the transformation exactly maps P1A on P1B, P2A on P2B and P3A on P3B. All remaining positions on the slices are interpolated linearly. Thus, the method performs a registration by translation, scaling and rotation into one common coordinate system, e.g., the coordinate system of image A. In other embodiments, co-registration approaches can be used that include automated landmark detection and non-linear transformations, e.g., with splines. These approaches optimize the co-registration to find a best fitting overlay of corresponding images.

In the first embodiment, one slice is assigned to be the master image from which a downscaled small image (SI) is derived. The small image is then subdivided into tile regions. Each small image is prepared to store hyperspectral data. For all co-registered slices, the shape of the tiles is the same, and there is a spatial isomorphism between the tiles. Different tile shapes can be used for different image analysis projects, but in most cases the tiles are simply squares. The projected shapes of the tiles are then used to capture and produce high resolution tiles from the master image by copying raster data contents to sub-scenes according to the coordinate transformation. The resulting high-resolution sub-scenes can then be analyzed in parallel. Because all tiles are tagged with a tile ID and emerging co-registered sub-scenes for each stained slice carry corresponding tile IDs, it is possible to track, collect and interchange information between the tiles.

FIG. 1 illustrates the production and processing of the high-resolution sub-scenes (tiles) from a master image. FIG. 1 shows a high-resolution master image 20 of a tissue slice 21 from which a downscaled image 22 copy is made. Downscaled image 22 is a small image formatted in a manner capable of storing hyperspectral data. For each tile object of the downscaled image 22, information obtained from the corresponding full-resolution tile is stored. The tile objects of the gridded downscaled image 23 are projected onto the full resolution image 20 and define shapes of the tiles 24. In preprocessing steps, the full resolution tiles are processed in parallel to perform image analysis. Finally, FIG. 1 illustrates the transfer in post-processing steps of image analysis results back to the tile objects linked to image 23.

Figure 2:
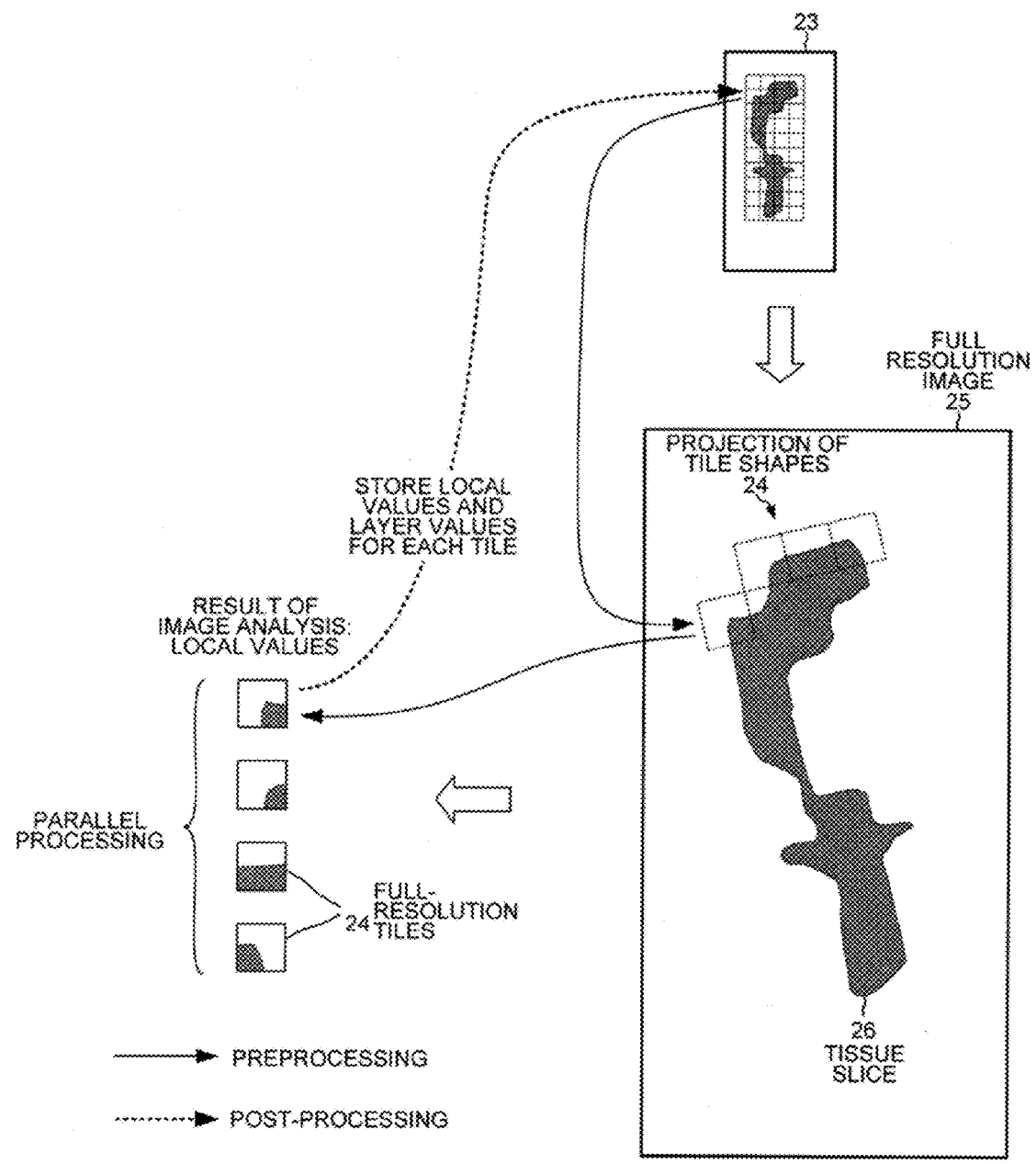
FIG. 2 is a diagram illustrating coordinate transformation for co-registration of a second image slice stained with a different biomarker.

FIG. 2 illustrates how coordinate transformation for co-registration is performed in order to project tile shapes onto a second digital image 25 of another slice 26 of the tissue sample that has been stained with a different biomarker. FIG. 2 illustrates the same process as performed in FIG. 1 except that the tile shapes are projected onto the other slice 26 with the different stain. When retrieved from staining, the other slice 26 is not aligned with first slice 21. Because co-registration of full-resolution images can consume a large amount of memory and processing resources, it is more efficient to perform the transformation and co-registration on a tile-by-tile basis. Each tile of the differently stained second slice 26 is then matches to its corresponding master tile, and image analysis results are transferred to corresponding tile objects generated with the gridded downscaled image 23 from the master image.

Figure 3C:
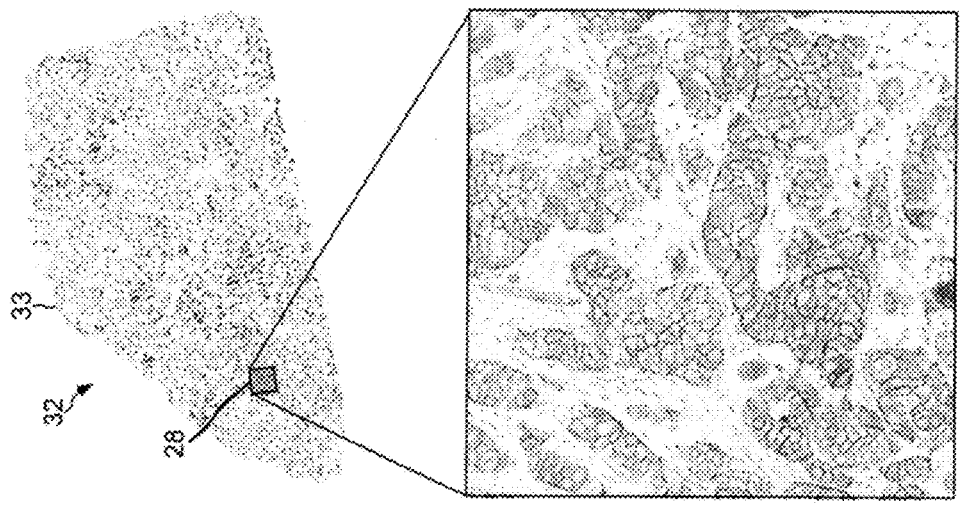
FIGS. 3A-C show the corresponding positions and co-registered contents of three differently stained slices of a sample tissue, including a sample position of a single tile.
Figure 3B:
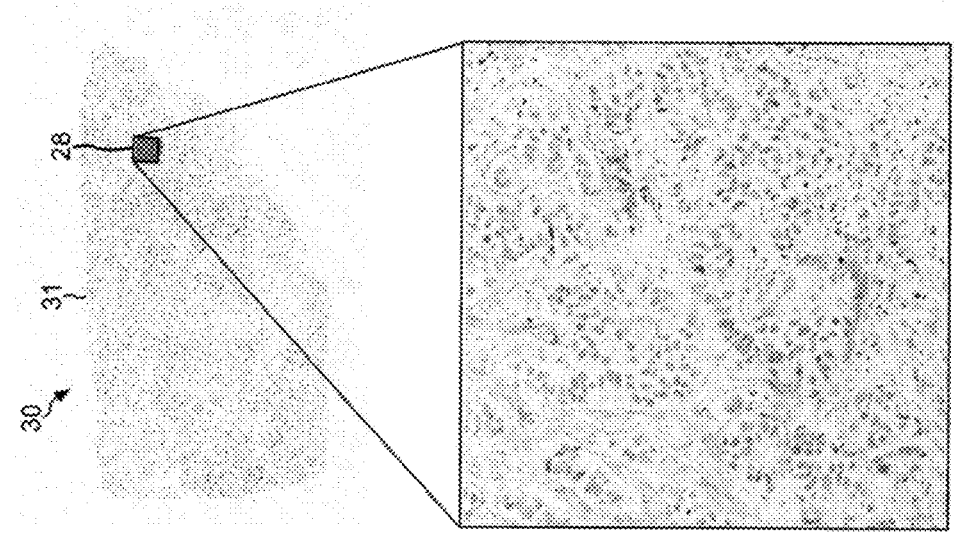
Figure 3A:
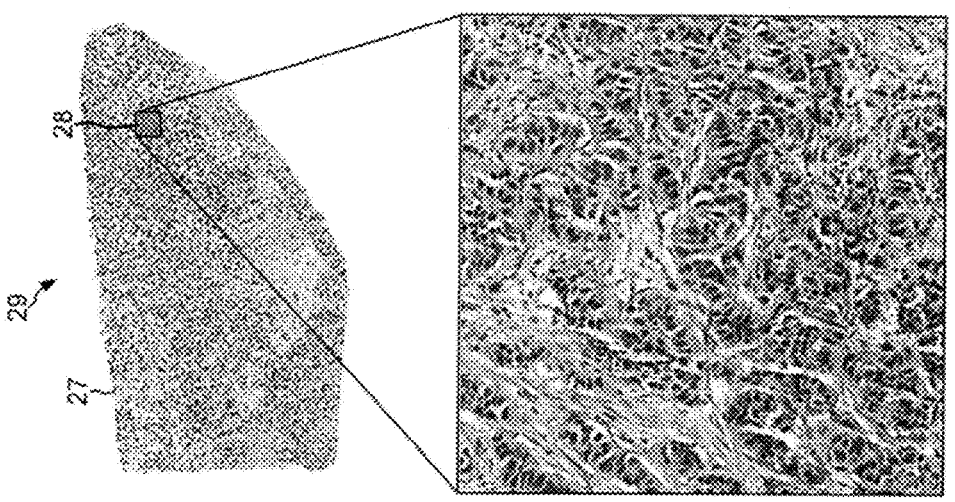

FIGS. 3A-C show the corresponding positions and co-registered contents of three differently stained slices of a sample tissue. FIG. 3A shows a slice 27 assigned to be the master and a sample position of a single tile 28 on a downscaled image 29. FIG. 3A also shows tile 28 in high resolution. FIG. 3B shows a downscaled image 30 of another slice 31 upon which the shape of tile 28 is projected. Slice 31 of the tissue is stained with a different biomarker than is first slice 27. FIG. 3B also shows a high resolution image of tile 28 obtained from the high resolution image from which second downscaled image 30 was generated. FIG. 3C shows a downscaled image 32 with the shape of tile 28 (determined from the master image in FIG. 3A) projected on a slice 33 in which the tissue has been rotated about 180° compared to FIG. 3A. The slice in FIG. 3C has been stained by yet another biomarker. FIG. 3C shows the high resolution image of tile 28 obtained from the high resolution image from which third downscaled image 32 was generated.

Figure 4:
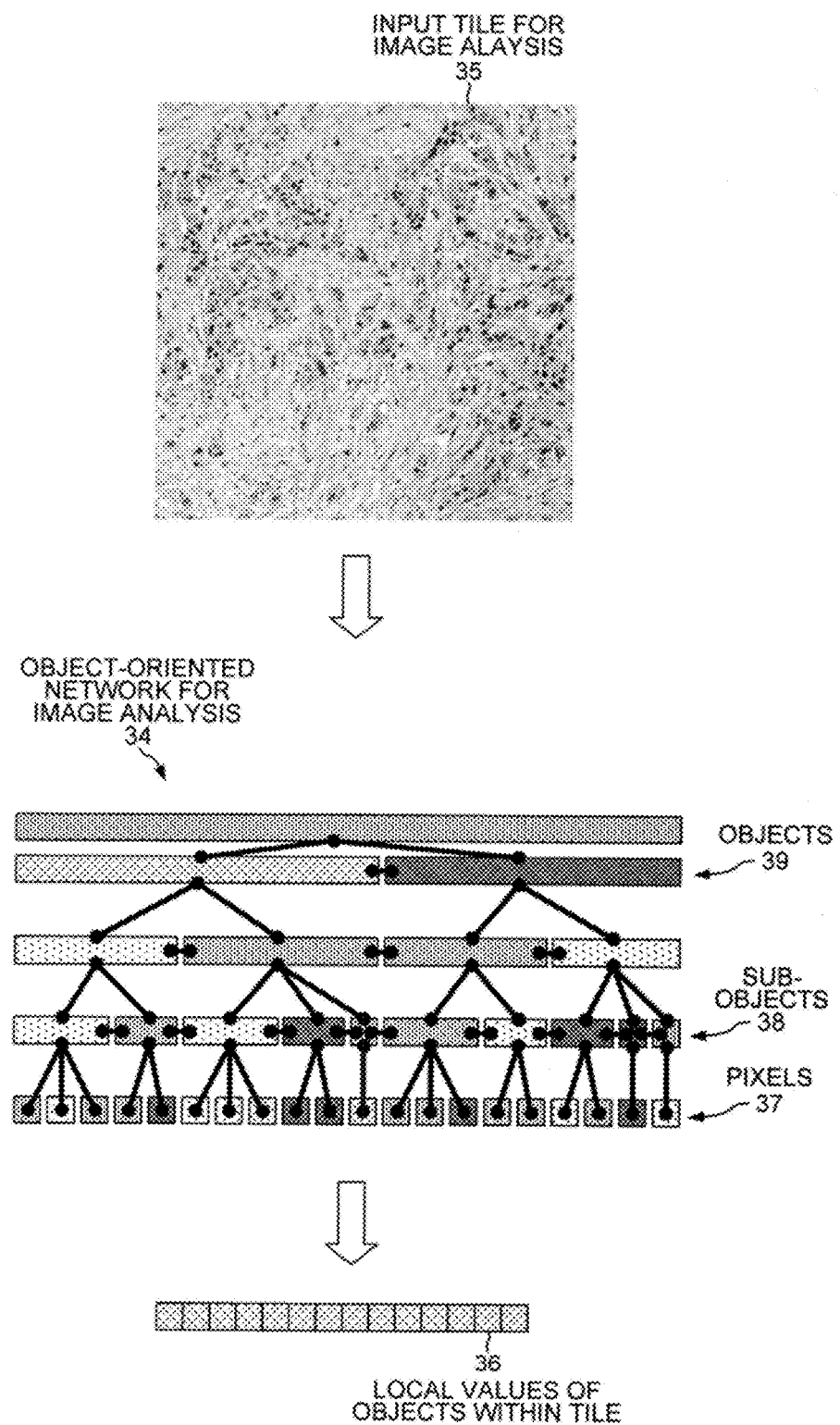
FIG. 4 illustrates an object-oriented cognition network and an output vector generated from a high-resolution tile of an image slice.

FIG. 4 illustrates the image analysis performed on the high resolution tiles. An object-oriented cognition network 34 is generated from a high-resolution input tile 35 upon which image analysis is performed. The object-oriented network 34 is used to generate an output vector 36 made up of the local values of objects within tile 35 that are defined by the network 34. Pixels 37 are linked together to form sub-objects 38. Sub-objects are classified as belonging to objects 39. For example, an object could be a cell, and one local value could be the diameter of the cell. The values quantifying many characteristics of the cell together make up the output vector 36. Thus, the image analysis operates on tiles and produces vectors with local values. All feature vectors from all tiles from all the co-registered slices are stored in layers of the formatted downscaled image 23. This means for an equal number of features for the different slices, n*N layers will be produced. In most cases this leads to a large number of layers representing a high level of complexity that is, however, compensated by the small image size of the hyperspectral downscaled image 22. Alternatively, resulting data is stored as variable values of corresponding tile objects or together with spatial information in a database for storage and further processing.

Figure 5:
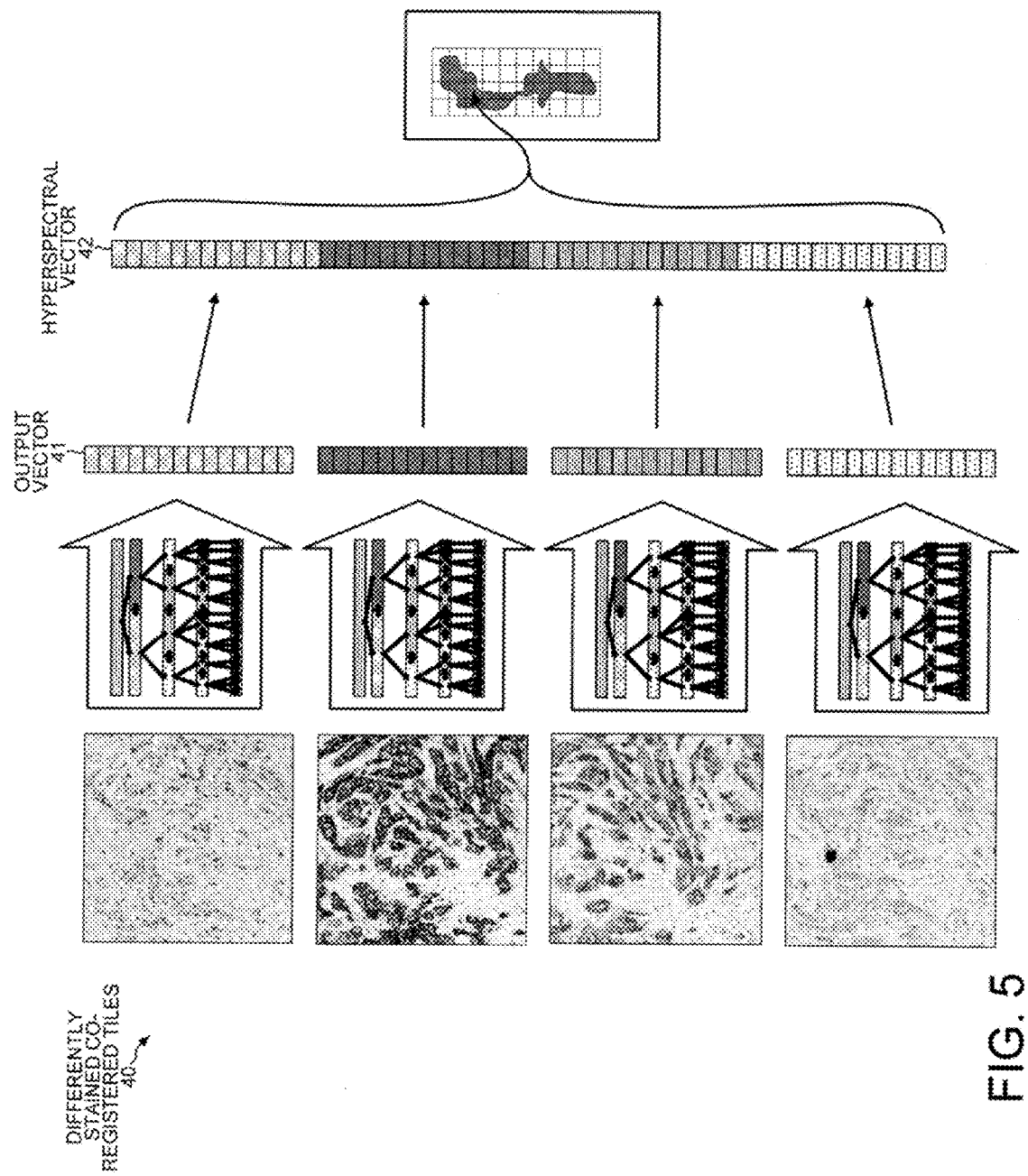
FIG. 5 illustrates a tile with a combined feature vector being generated from the co-registered positions in differently stained tissue slices.

FIG. 5 shows how the processing of a tile from corresponding positions in differently stained slices results in a combined feature vector, which then is linked to its tile region or object. Image analysis is performed by Cognition Network Technology (CNT) software on each of the differently stained co-registered tiles 40 to produce an output vector 41. The output vectors 41 for the various slices are then combined into a hyperspectral vector 42. Each hyperspectral vector 42 is then assigned to the corresponding tile object of formatted downscaled image 23. The image analysis performed by the CNT software is customized for each stain such that the output vectors 41 carry specific stain-related information.

Figure 6:
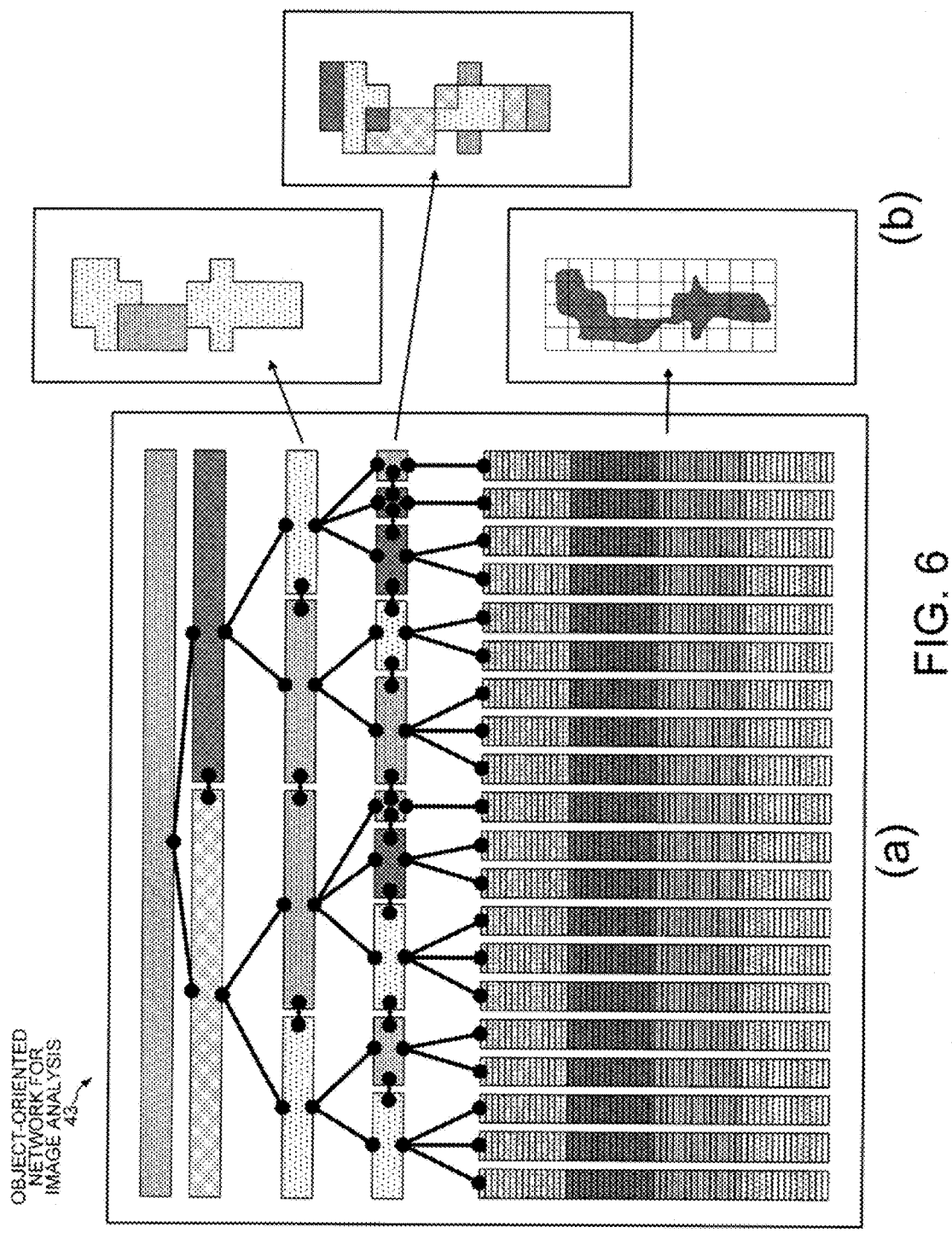
FIG. 6 is a diagram of an object-oriented network generated using tile information and feature vectors from differently stained tissue slices.

These steps are performed for all tiles. The resulting vectors with features from different stains constitute the basis for a new object-oriented Cognition Network 43, as shown in FIG. 6. FIG. 6(*a*) shows a Cognition Network based on vectors with tile information from the image processing of FIG. 5. This hyperspectral data is stored in a database as objects of the layers of network 43. FIG. 6(*b*) shows an analysis solution obtained by creating CNT objects of higher order. Each object in a hierarchical layer of network 43 is linked to one or more objects in a lower hierarchical layer. The lowest layer is no longer data related to individual pixels but rather multispectral data associated with a lower resolution tile that has been stained by multiple biomarkers. Because the input information originates from spatially ordered tiles, the information can be formatted and displayed as a multispectral image with the resolution of the tiles. In this sense it is a coarse representation of the master slice carrying information from high resolution processing of co-registered tiles with different stains. Using this procedure, it is possible to continue and create solutions with CNT like in traditional processing with single images.

Figure 7:
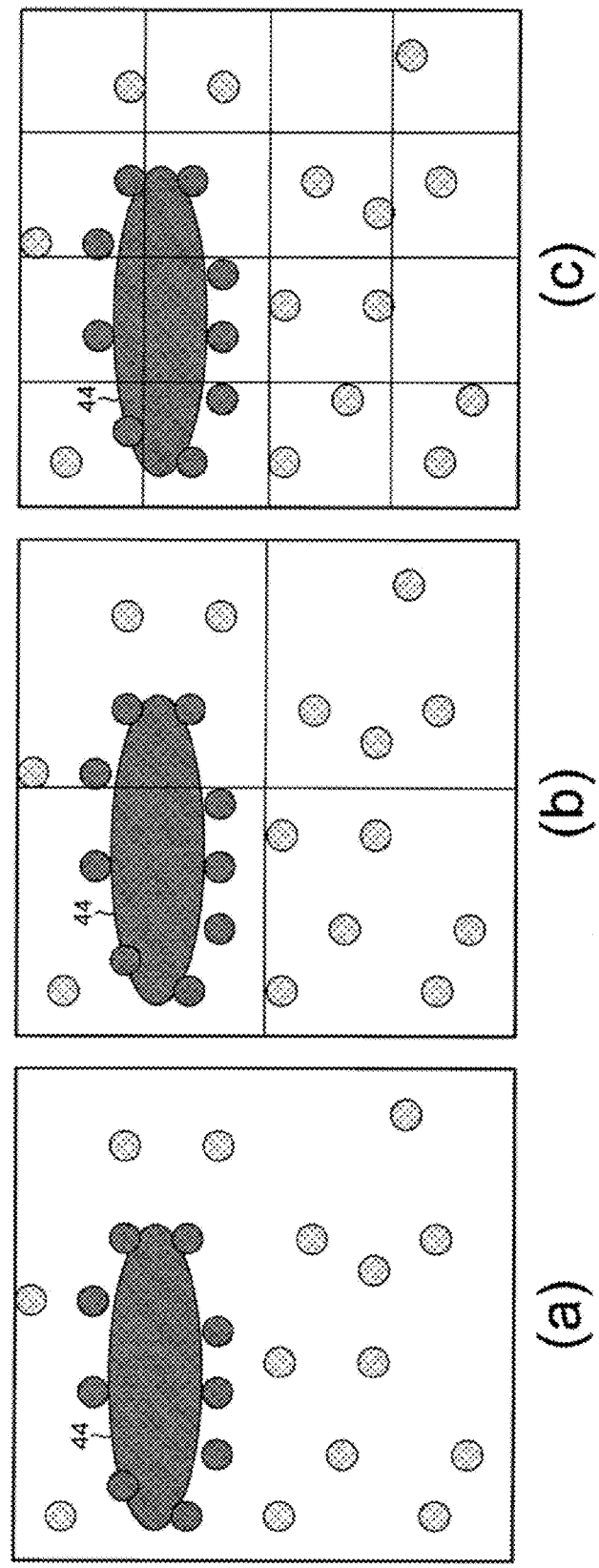
FIG. 7 shows a physical object of a tissue slice split between different neighboring tiles of an image of the slice.

The CNT software also enables local virtual processing involving virtual stitching, virtual fusion and virtual objects. When applying the method described above, very often objects at the boundaries of the tiles are cut in two or more pieces that belong to different neighboring tiles. The CNT software stitches the pieces together into one object at a higher level of the object-oriented network. Thus, multiples sub-objects of the network can belong to an upper object that represents a physical object, such as the same lumen, membrane or nucleus. For nuclei, the problem of splitting physical objects at the boundaries of tiles is of less importance as there are usually many more nuclei within the tile than those located at the border of the tile. As for the method described here, the statistical evaluations represent the key values, and any errors produced by small objects lying at the tile borders are relatively small. This is not the case for bigger objects such as lumina. The uncertainty of the classification of bigger objects located at the tile boundary must therefore be resolved. The CNT software determines how correctly to classify and how to assign the parts of the "whole" original physical object to each other in the object-oriented networks. The pieces representing parts of the same physical object are contained in more than one of the neighboring tiles as shown in FIG. 7. The relatively large object 44, which could represent a lumen, is separated into two or more pieces, which are contained in separate tiles. FIG. 7(*b*) shows object 44 separated between two tiles, and FIG. 7(*c*) shows object 44 separated between six tiles.

As a solution to the problem of physical objects being split at the boundaries of tiles, objects that lie at a tile border are classified as "potential objects" (for instance "potential lumen") while a single tile is being analyzed and before the full structure is detected. After segmentation and classification of all tiles, there are some objects classified as "potential" lumen objects at the boundaries of the tiles. Stitching all high-resolution tiles into one big image would result into too much data to be analyzed. Stitching together low-resolution tiles would result in imprecise stitched objects. Therefore, a small group of high-resolution tiles are stitched together at one time. Which groups of tiles are stitched together is defined by specific decision criteria generated by the CNT software.

Such decision criteria are based on whether a given "potential object" abuts one of the selected borders. The selected borders define the groups of tiles that will be virtually merged as each selected border connects two tiles. The terms "virtual merge" and "virtual stitching" mean that the tiles are combined into a bigger region only for the purpose of performing final segmentation and classification of the potential objects. After this final classification of the potential objects is performed, the region is cut again into the previous tiles, and the statistical values for the individual tiles are calculated and stored.

In order to select the members of the groups of tiles to be stitched, each tile is investigated top determine whether its potential objects could belong to a whole object. If a tile is found that has potential objects attached to its borders, it is selected as a "starting tile." One possibility for selecting the other members of the group to be stitched is that all existing "selected borders" of one tile are picked to define the "neighboring tiles" as members of the group. Another possibility is that only one potential object in the starting tile is picked, and only those borders are defined as selected borders that are connected to this particular potential object. In the second possibility, a particular tile might have to be used as a starting tile several times in contrast to the first possibility where it will only be used as a starting tile once.

Additional members of the groups of tiles to be stitched might have to be selected if the potential object in a neighboring tile that touches the selected border also touches other borders of the neighboring tile besides the selected one. In this case, those other borders are also defined as selected borders, and the corresponding neighbors become part of the group of tiles as well. In the case where relevant objects that are extended over a large number of tiles or even the whole slide, this method will not be successful. In tissue slices, however, this usually does not occur for most relevant individual objects.

However, groups of similar relevant objects do commonly extend over a large number of tiles. An inflammation or a cancer region could represent such a case. For such large super-structures, merging the super-structures within many tiles can be managed using down-scaled tiles where the density of cancer nuclei or of inflammation nuclei is represented as layer values. When stitching all members of a particular group into one region, the members are positioned relative to each other in a way that corresponds to their neighborhood position in the original slice. This way an individual tile might be part of several groups and therefore is potentially treated several times. On the other hand, by this procedure the groups stay small and consist of at most nine tiles if potential objects in the neighboring tiles do not extend over more than one border line.

The CNT software performs several steps in order to detect objects of interest in multiple co-registered slices. The following lists the steps for detecting a lumen. First, objects in each tile are segmented and classified. Objects at the boundaries of the tiles are classified as "potential" lumen objects. Tiles containing potential lumina serve as starting tiles. Borders in the starting tiles with abutting lumina objects are defined as "selected borders." Each starting tile is stitched together with several other neighboring tiles into one region. Only those neighboring tiles are selected that are connected to a selected border of the starting tile. Neighboring tiles that are positioned diagonal to the starting tile are selected as well when they are connected to a selected neighboring tile. After a tile is stitched with its appropriate neighbors into a region, the potential lumina objects within the region are segmented and classified. Objects in the starting tile are measured, and statistical data from the objects in the starting tile are calculated and stored.

For image analysis and related feature generation, it is beneficial to work on tiles that are not too small. Tiles should not be so small that most of the objects of interest do not fall entirely within one tile. In addition, smaller tiles lead to a larger number of tiles. Performance is improved by reducing data-handling overhead if the number of tiles is reduced. On the other hand, local multispectral resolution is limited by tile size. To solve this contradiction, sub-tiles are introduced. Image processing is performed on tiles having the predetermined size required for proper feature generation, and then these tiles are subdivided into sub-tiles. Because tiles are typically square, sub-tiles are also square. For each sub-tile, local statistics are calculated and stored for further processing. Then feature-vectors of these sub-tiles constitute the base elements for the built-up object-based network 43 shown in FIG. 6. The feature vectors provide a higher resolution compared to the image processing size of the tiles.

Figure 8:
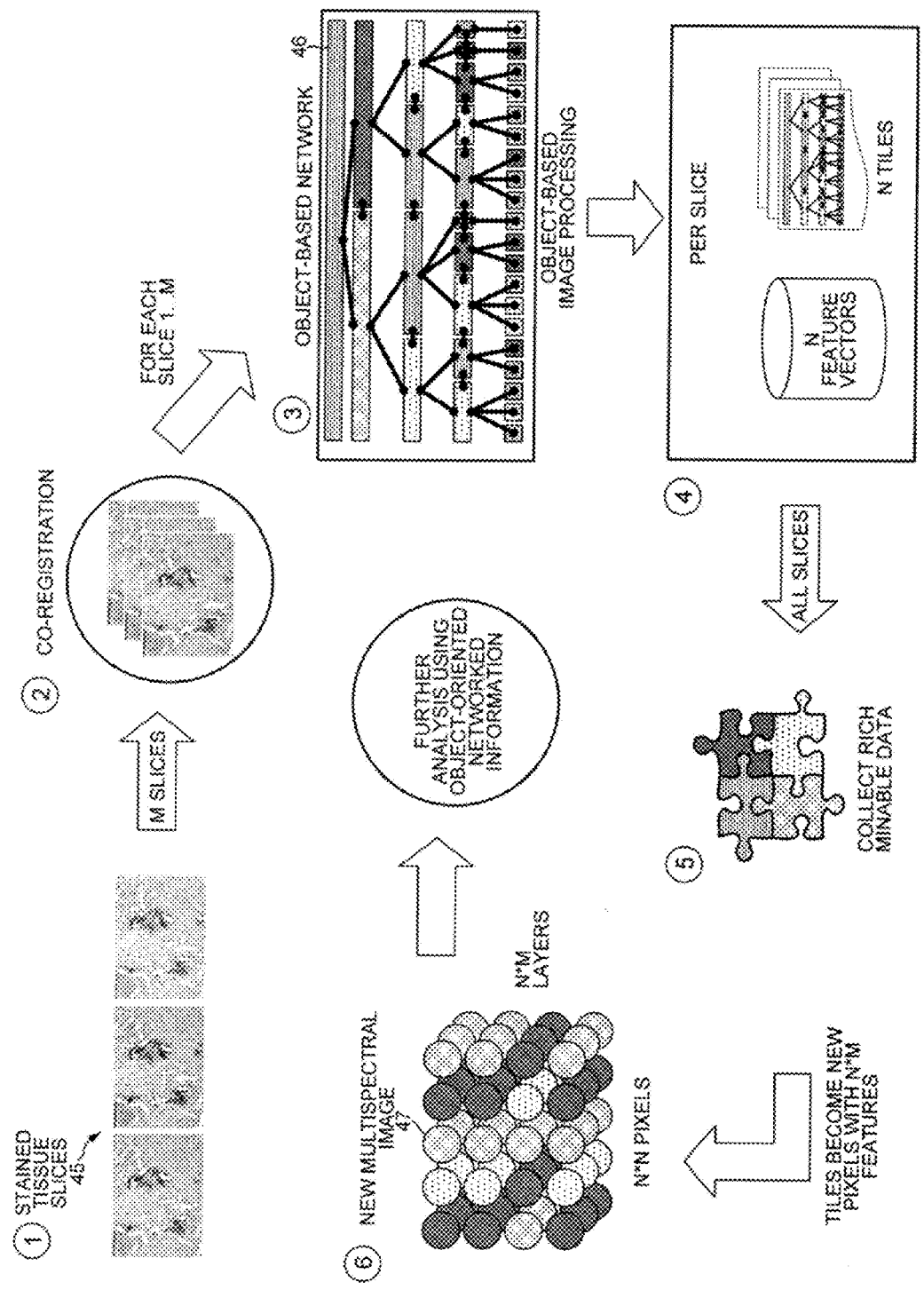
FIG. 8 is a diagram illustrating the steps for extracting information from hyperspectral images generated from co-registered tissue slices stained with different biomarkers.

FIG. 8 illustrates the steps of extracting information from hyperspectral images generated from co-registered tissue slices stained with different biomarkers. In step 1, multiple adjacent tissue slices 45 are stained with different biomarkers, for example, M slices. In step 2, digital images of the M slices are co-registered. For example, the digital images are digital pathology slides. In step 3, the digital image of each of the slices is analyzed using an object-based network 46. In step 4, each slice is divided into N tiles. Each of the N tiles is processed separately. A feature vector is generated for each of the N tiles. In step 5, information from co-registered tiles is correlated with each other. Due to co-registration, each tile of one slice is linked to comparable tiles of differently stained slices. After collecting the data from all slices, the resulting data is formatted as a new multispectral image 47 in step 6. Each tile and its corresponding feature vector is associated with a pixel of the multispectral image. The tile becomes a pixel, and the corresponding feature vectors (concatenated from all stains) are layers of information linked to the pixel. Thus, the new multispectral image is structured as an object-based network such as network 43 of FIG. 6. Further image analysis is performed on new image 47.

Figure 9:
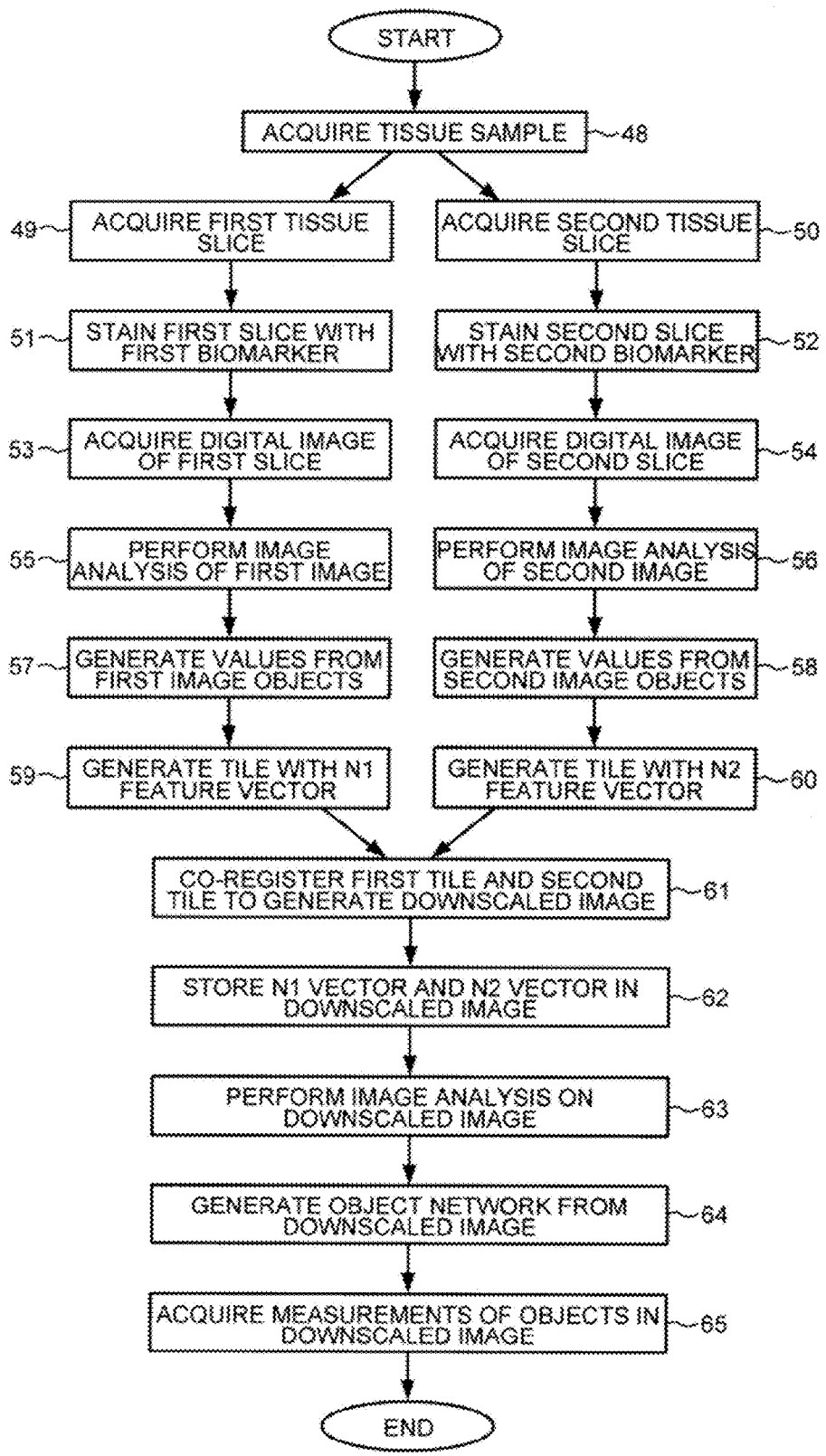
FIG. 9 is a flowchart of steps for extracting information from hyperspectral images generated from co-registered tissue slices stained with different biomarkers.

FIG. 9 illustrates a more detailed embodiment for extracting information from hyperspectral images generated from co-registered tissue slices stained with different biomarkers. In a first step 48, a tissue sample is obtained from a patient. In steps 49-50, the tissue sample is sectioned and transferred to glass slides. A section identifier (SID) is associated with each section (slice). Several slices are taken in consecutive order, and that order is stored with the section SID. In steps 51-52, the tissue on each glass slide is processed with a predefined protocol and method. For example, the first slice is stained with a first biomarker in step 51, and the second slice is stained with a different biomarker in step 52. Common staining methods used in histology are H&E staining, immunohistochemistry (IHC) and immunofluorescence (IF). In steps 53-54, each slice is digitized using a digital microscope or a tissue slide scanner, and the resulting digital image is stored in a database.

In steps 55-56, the CNT software uses image analysis algorithms to processes the image of each slide (slice). The algorithm depends on the type of staining applied to the slice of tissue. The algorithm detects large, medium, small and fine scale image objects in each image. The objects are defined as elements of a hierarchical object-oriented network. In steps 57-58, values are generated using the objects of the network. For example, one value is obtained from cell objects and corresponds to the number of mitotic objects in a defined area of an H&E stained tissue slice. Another value corresponds to the Allred score measured on an immunohistochemically stained tissue slice. In steps 59-60, the image of each slice is divided into tiles. A set of statistical image object features is calculated for each tile. The image object features are linked as a feature vector to the corresponding tile.

In step 61, a downscaled image is generated using the tiles of the images of the slices. Corresponding tiles of adjacent slice images are co-registered. Each tile becomes a pixel of the new downscaled hyperspectral image. The multiple co-registered tiles of the various slices make up multiple image channels of the downscaled hyperspectral image. The value of a pixel in a single image channel corresponds to the feature value of one of the associated tiles. The name of the image channel is associated with the name of the extracted feature.

In step 62, the feature vectors of each of the multiple co-registered tiles are stored as part of the hyperspectral image. The feature vectors are linked to the associated pixel. In step 63, the hyperspectral image is displayed on a computer monitor, or an additional image analysis process segments the hyperspectral image, measures the generated image objects and stores those objects on a computer file system. In step 64, a hierarchical object network is generated from the objects obtained from image analysis performed on the new downscaled hyperspectral image. In step 65, measurements and statistical values are obtained from the network objects from the downscaled hyperspectral image.

Hyperspectral images can also be co-registered with each other. A hyperspectral image obtained from several tissue slices is registered to another hyperspectral image obtained from adjacent tissue slices. The registration utilizes those image channels (stains) that show the best correlations across the slices. By registering multiple hyperspectral images with each other, yet another hyperspectral image is generated that combines the channel values from all tiles of all tissue slices.

FIG. 9 depicts the steps performed to obtain measurements from hyperspectral images generated from tissue slices stained with multiple biomarkers. The procedure is used to diagnose the state of a patient using a multiplexed tissue-based test. H&E staining may be multiplexed with IHC markers, or several IHC markers may be used in tissue processing, or H&E, IHC and IF may be used altogether. One specific application is a breast panel in which H&E, IHC ER, PR and HER2, and IF HER2 and Chr17 are used. By creating a hyperspectral image from consecutive sections of a tissue sample, the novel method allows the generation of hyperspectral image objects that provide a rich descriptor set. In diagnostics development, this descriptor set can be correlated with clinical endpoints. One application may use a fuzzy classifier to predict the disease free survival time using the properties of image objects generated from the hyperspectral image. Using a false-color visualization of the hyperspectral image, it is possible to depict the specific subtype of a tumor present in the tissue sample, or to discriminate various types of inflammation cells according to their spectral profile.

Figure 10:
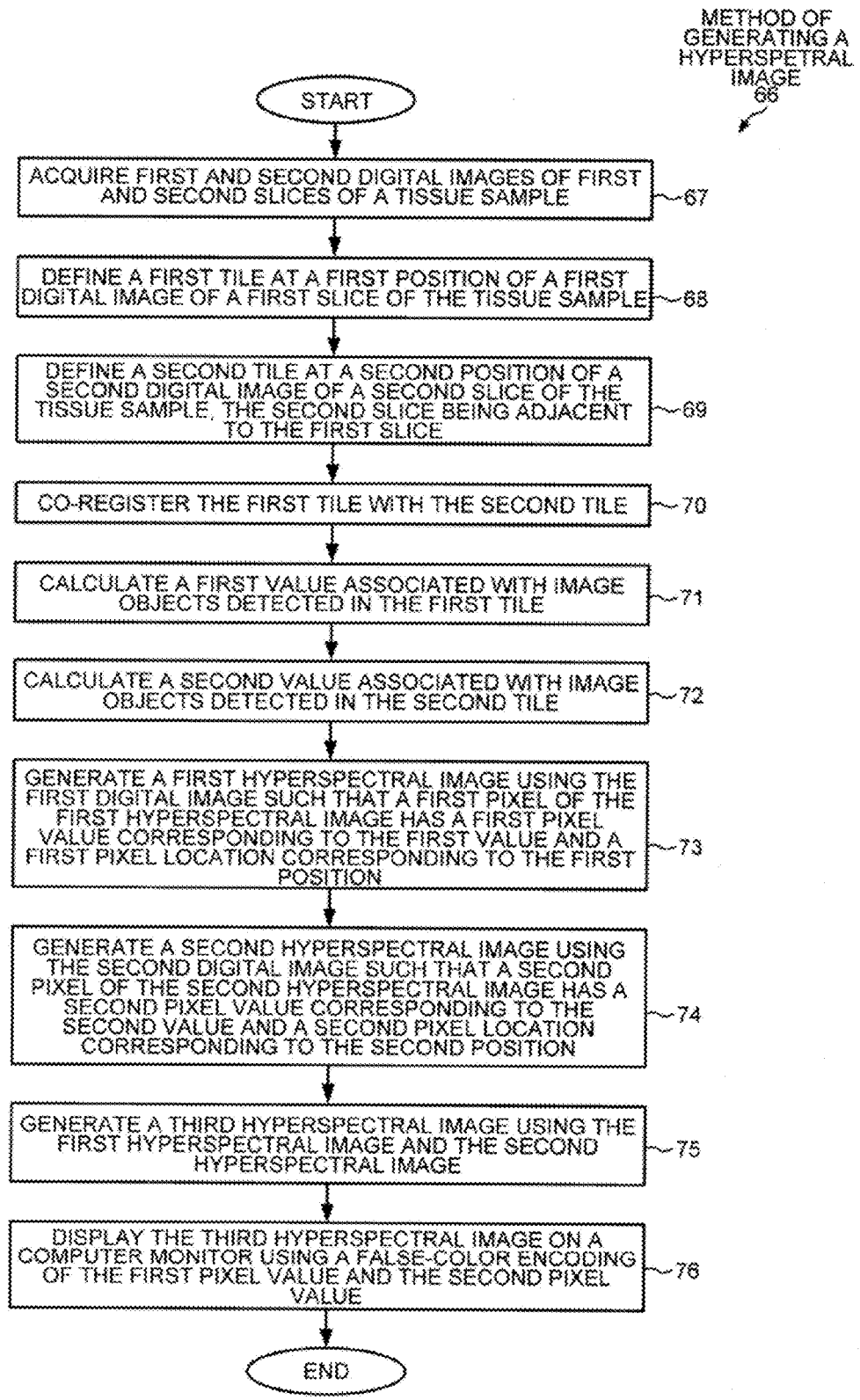
FIG. 10 is a flowchart of another embodiment of a method for analyzing digital images to generate hyperspectral images.

FIG. 10 is a flowchart of another embodiment of a method 66 for analyzing digital images to generate hyperspectral images. In method 66, tiles of the digital images are co-registered instead of the entire full-resolution images themselves. Method 66 includes steps 67-76 76 in which multiple hyperspectral images are combined to generate a hybrid hyperspectral image that provides diagnostic insights not otherwise retrievable from the digital images of tissue slices. In one implementation, the various tissue slices are each stained with a different biomarker.

Figure 11:
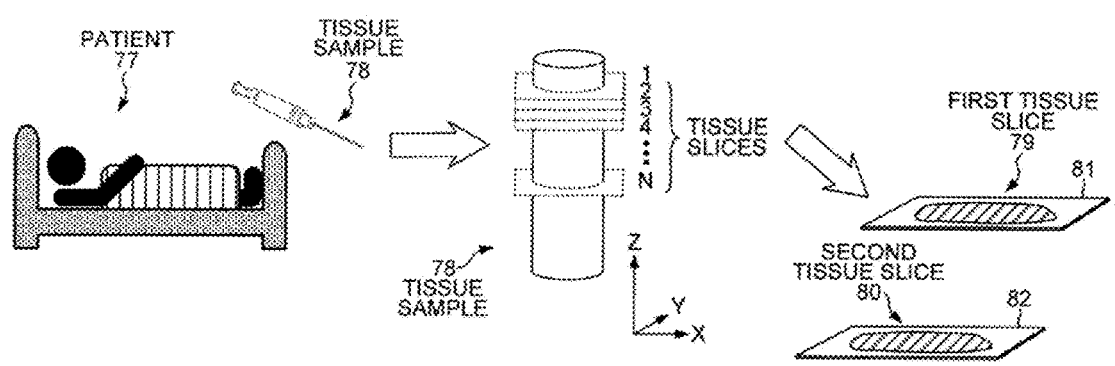
FIG. 11 is a diagram illustrating the process of acquiring the digital images whose tiles are to be co-registered and used to generate hyperspectral images.

In a first step 67, digital images are acquired from slices of a tissue sample. FIG. 11 illustrates the process of acquiring the digital images that are to be used to generate hyperspectral images and whose tiles are co-registered. The tissue portions that are to be stained with various protein and receptor biomarkers are typically taken from a live patient 77 in the form of a biopsy. The tissue sample 78 is then sliced into many slices. The planar slices are adjacent to one another and are located at the same position of the tissue sample in the x and y dimensions. FIG. 11 shows a first slice 79 on a first slide 81 as well as a second slice 80 on a second slide 82. Second slice 80 originated from tissue sample 78 adjacent to first slice 79.

Before being put on a slide 81, first slice 79 is stained with a first biomarker. In some implementations, the slice is first placed on the slide and then stained with a drop of solution containing the biomarker. Second slice 80 is stained with a different biomarker. There are so many available protein and receptor biomarkers that it is a challenge meaningfully to apply the information of how each different biomarker stain reacts with a tissue sample. In one embodiment, the method combines the results of a limited number of well known biomarkers, such as hematoxylin and eosin (HE), Human Epidermal growth factor Receptor 2 (Her2), Her2/neu cytoplasmic stain, estrogen receptor (ER) stain, progesterone receptor (PR) stain, tumor marker Ki67, Mib, SishChr17, SishHer2, cluster of differentiation 44 (CD44) antibody stain and CD23 antibody stain. For example, first slice 79 is stained with the Mib biomarker, and second slice 81 is stained with the tumor marker Ki67. High resolution digital images are then taken of each stained slice. A first digital image 83 is taken of first slice 79, and a second digital image 84 is taken of second slice 80. In the field of pathology, the image is sometimes referred to as a "sectional digital image." In the field of radiology, the image is sometimes referred to as the "slice."

Because the slices are very thin, each slice contains practically the same types of tissue. The same tissue reacts uniquely with each different biomarker. So the most meaningful information can be obtained by comparing how the same particular tissue was stained by multiple different biomarkers. In order to determine which locations on different slices correspond to the same tissues, however, locations on the two digital images 83-84 of slices 79-80 must first be co-registered with one another. When each slice is removed from the staining solution, the slice may be in any orientation, for example, rotated about its center of gravity or flipped from its back side to front side. The higher resolution images 83-84 are acquired of the slices 79-80 in whatever orientation those slices are placed on the slides 81-82 after being pulled from the staining solution. In step 67, first and second digital images 83-84 are acquired of first and second slices 79-80 of tissue sample 78.

Figure 12:
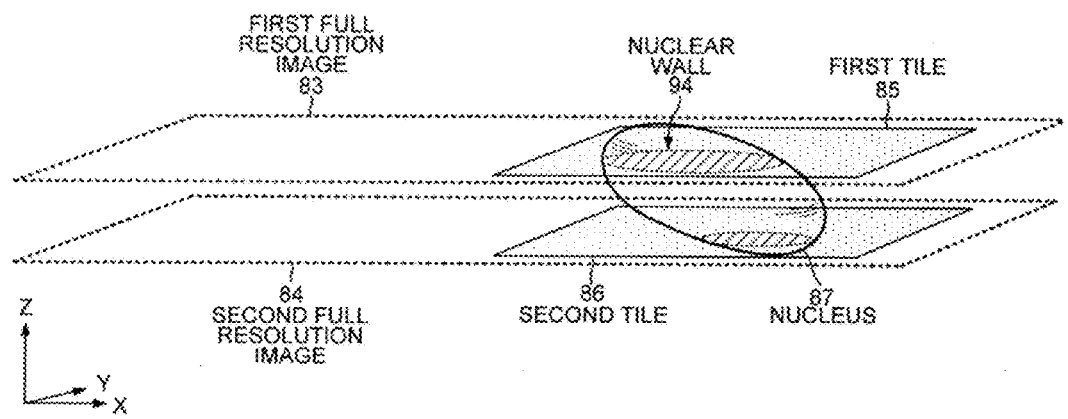
FIG. 12 is a diagram showing a first tile on a first digital image that is to be co-registered with a second tile on a second digital image.

FIG. 12 illustrates step 68 in which the CNT software defines a first tile 85 on first digital image 83 of first slice 79 of tissue sample 78. The dashed plane in FIG. 12 represents only a small portion of first full resolution digital image 83. Thus, first tile 85 covers only a small portion of the entire high-resolution image 83. First tile 85 is located at a first position in the x and y dimensions of first image 83.

In step 69, a second tile 86 is defined on second full-resolution digital image 84 of second slice 80 of tissue sample 78. Second tile 86 has a second position in second digital image 84 in the x and y dimensions. Because second slice 80 originated from tissue sample 78 adjacent to first slice 79, portions of some tissue objects are present in both slices. For example, cross sections of portions of a nucleus 87 are present in both first image 83 and second image 84.

Figure 13:
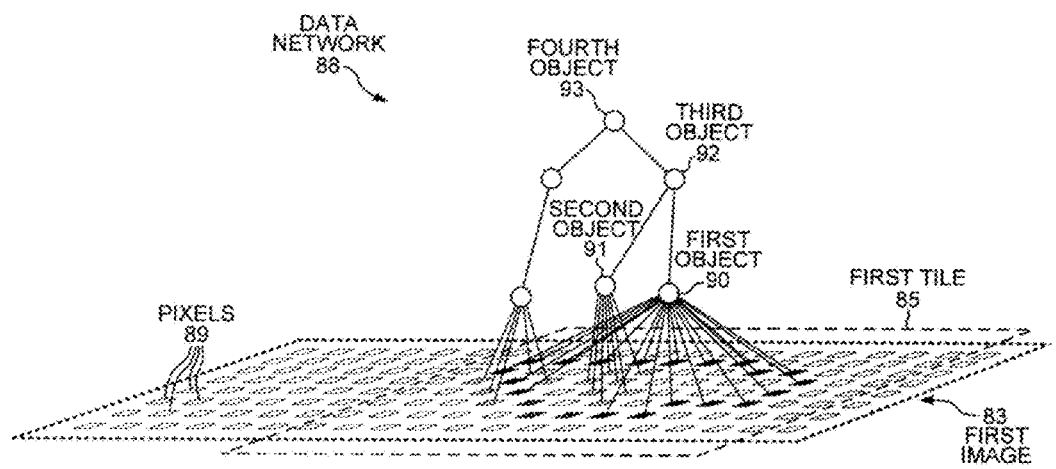
FIG. 13 is a diagram of a data network generated by performing image analysis on the first digital image of FIG. 12.

FIG. 12 is not drawn to scale. The size of an actual tile would encompass many nuclei and cells. Image analysis is performed on each of images 83-84, and a hierarchical data network of image objects is generated for each image. FIG. 13 shows an exemplary data network 88 generated from first image 83. The CNT software generates data network 88 by selectively linking pixels 89 from digital image 83 to objects according to a process hierarchy of steps and algorithms and according to a classification network. First image 83 is comprised of pixel values associated with the locations of each of the pixels 89. The CNT software operates on the digital pixel values and links the pixels to form objects. Each object is linked to a set of pixel locations based on the associated pixel values. For example, data network 88 includes a first object 90, a second object 91, a third object 92 and a fourth object 93. First object 90 and second object 91 are generated by linking to each object those pixels having similar characteristics, such as brightness as defined by the pixel value. Thresholds of brightness at pixel locations that are grouped together can be obtained from a histogram of the pixel values in the digital image. The image objects are then linked together into classes according to membership functions of the classes. The image objects in network 88 represent instances of classes in the classification network that are detected by the CNT software. Objects in a lower hierarchical level that belong together are linked to the same object in a higher hierarchical level. In this manner, for example, all of the components of a nucleus can be linked together to form one image object "nucleus." For example, object 93 in FIG. 13 represents nucleus 87 in FIG. 12.

In step 70, corresponding tiles on digital images 83-84 are co-registered with each other. Co-registering pairs of tiles is less computationally intensive than co-registering entire full-resolution images. Moreover, co-registering tiles is more accurate than co-registering entire images because of stretching and skewing of the tissue slices. Thus, even if one entire image is optimally rotated and translated with respect to a second entire image, corresponding tissues will align only locally around the center of rotation but will be offset from one another at locations distant from the center of rotation due to stretching and skewing. Thus, co-registering pairs of tiles provides a better alignment of the tissues. The image objects in network 88 are used to co-register first tile 85 with second tile 86.

Each of the objects in network 88 can also be measured using data network 88. The CNT software generates values associated with the measurements. For example, the length of the nuclear wall 94 represented by object 90 is measured as the number of contiguous stained pixel locations that make up a one-pixel wide nuclear wall. By filtering out pixel values, an edge filter removes pixels from first object 90 that form a wall more than one pixel wide, thereby simplifying the measurement of the length of the nuclear wall of object 90 of data network 88.

In step 71, a first value associated with image objects detected in first tile 85 is calculated. For example, the first value is the number of stained nuclei in the area of first tile 85. As stated above, nucleus 87 is not illustrated to scale in FIG. 12. Typically, dozens or even hundreds of nuclei would be present in the area of a tile. A tile includes thousands or millions of pixels. For example, the first value might be fifty stained nuclei in first tile 85. The CNT software generates image objects from those nuclei that have been stained by the first biomarker. Because first tissue slice 79 was adjacent to second tissue slice 80 in sample 78, portions of most nuclei appear in both first image 83 and second image 84. The nuclei react differently, however, to the different biomarkers. Because first tile 85 is co-registered with second tile 86, portions of most of the fifty stained nuclei from first tile 85 would probably also be present in second tile 86. Portions of a nucleus are not present in both tiles where the last end slice of a nucleus is present in one of the tissue slices.

In step 72, a second value associated with image objects detected in second tile 86 is calculated. For example, the second value is the average proportion of each nuclear membrane that has been stained. The nuclei might on average have only 75% of their membranes stained by the second biomarker.

In another embodiment, the first and second values are more complex than just the number or size of objects generated from image analysis. For example, the first and second values can be histopathological scores associated with a particular biomarker or biomarker combination, such as the Allred score, the Gleason score, the Elston-Ellis score, and the HercepTest score. The Allred score indicates the percentage of cells that have been stained to a certain intensity by the estrogen receptor (ER) antibody. The Gleason score is based on the architectural pattern of the glands of the tumor tissue. The Elston-Ellis score is determined by summing scores for three parameters: tubule formation, nuclear pleomorphism and mitosis per ten high-power fields (HPF) of 400×. The CNT software uses image analysis to determine the proportion of tubules, the similarity of nucleus sizes and the number of dividing cells per high power field of 400× magnification. The HercepTest represents the level of HER2 protein overexpresssion based on the degree of membrane staining. Complete membrane staining of some tumor cells results in a high score irrespective of the percentage of tumor cells that are stained. The CNT software determines whether each membrane object has the stain color around the entire membrane.

The first and second values can also be statistical values based on the measurement of objects generated from image analysis. For example, the first value can be the mean, median, minimum, maximum, to quantile, or standard deviation of a property of a subset of the image objects detected in first tile 85. One example of a subset of image objects are those cells whose membranes are completely stained by a particular biomarker. Another example of a statistical value is a weighted mean. For example, the first value is calculated using a distance weighted mean of a property of a subset of the image objects detected in the first tile, such as cells with stained membranes. The distance weighted mean is based on distances from the center of first tile 85 to the center of each of the stained cells.

Figure 14:
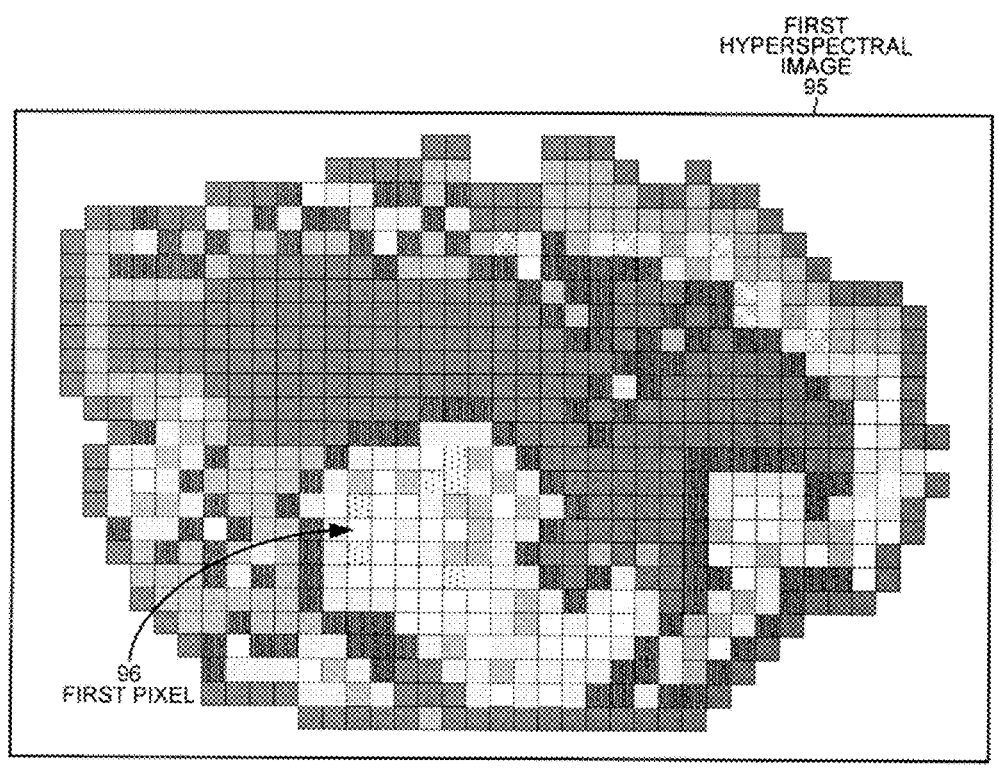
FIG. 14 is a hyperspectral image in which the location of each pixel corresponds to the position of a corresponding tile of the first digital image of FIG. 12.

In step 73, a first hyperspectral image 95 is generated using first digital image 83. A first pixel 96 of first hyperspectral image 95 has a first pixel value corresponding to the first value and a first pixel location corresponding to the first position of first tile 85. FIG. 14 shows first hyperspectral image 95 in which the location of each pixel 96 corresponds to the position of the corresponding tile of first image 83. Thus, the location of first pixel 96 in first hyperspectral image 95 corresponds to the position of first tile 85 in first image 83. In the exemplary embodiment, the first pixel value corresponds the number of stained nuclei in the area of first tile 85. In FIG. 14, a higher density of stained nuclei in first image 83 results in a brighter pixel in hyperspectral image 95. White first pixel 96 indicates that there are more stained nuclei in first tile 85 than in the surrounding tiles.

In step 74, a second hyperspectral image is generated using second digital image 84. A second pixel of the second hyperspectral image has a second pixel value corresponding to the second value and a second pixel location corresponding to the second position of second tile 86. Whereas brighter pixels in first hyperspectral image 95 indicate a higher density of stained nuclei, brighter pixels in the second hyperspectral image might indicate a higher malignancy of the stained cells. The malignancy is roughly proportional to the proportion of each nuclear membrane that is stained. Alternatively, brighter pixels in the second hyperspectral image could indicate the presence of a type of cancer that is more likely to respond to a particular type of drug, such as Herceptin® (trastuzumab).

In step 75, a third hyperspectral image is generated by combining first hyperspectral image 95 with the second hyperspectral image. For example, the third hyperspectral image provides a better indication of the tumor area in tissue sample 78. By combining the results of measurements performed on image objects detected in differently stained co-registered tissues, additional diagnostic information can be extracted from tissue sample 78.

In step 76, the third hyperspectral image is then displayed on a computer monitor using a false-color encoding of the first pixel value and the second pixel value. The combined results depicted in the first and second hyperspectral images are assigned colors based on ranges of numerical values of the results. In one embodiment, the first pixel value and the second pixel value are used to generate a false-color encoding using the hue, saturation and brightness color space. The hue component is calculated as the arctangent of the ratio of the first and second pixel values, the brightness is proportional to the sum of the first and second pixel values, and the saturation is constant. In another embodiment, the third hyperspectral image is generated by combining the first and second hyperspectral images with yet another hyperspectral image. The resulting three values for the corresponding pixels of the first and second hyperspectral images and the additional hyperspectral image are used to encode a false-color of red-green-blue (RGB) color coordinates. Each of the three values is mapped to one of the RGB color coordinates to define the color of each pixel of the third hyperspetral image displayed on the computer monitor. In addition to the combined results, it is also possible simultaneously to display the results of multiple hyperspectral images along with the combined hyperspectral image.

Figure 15:
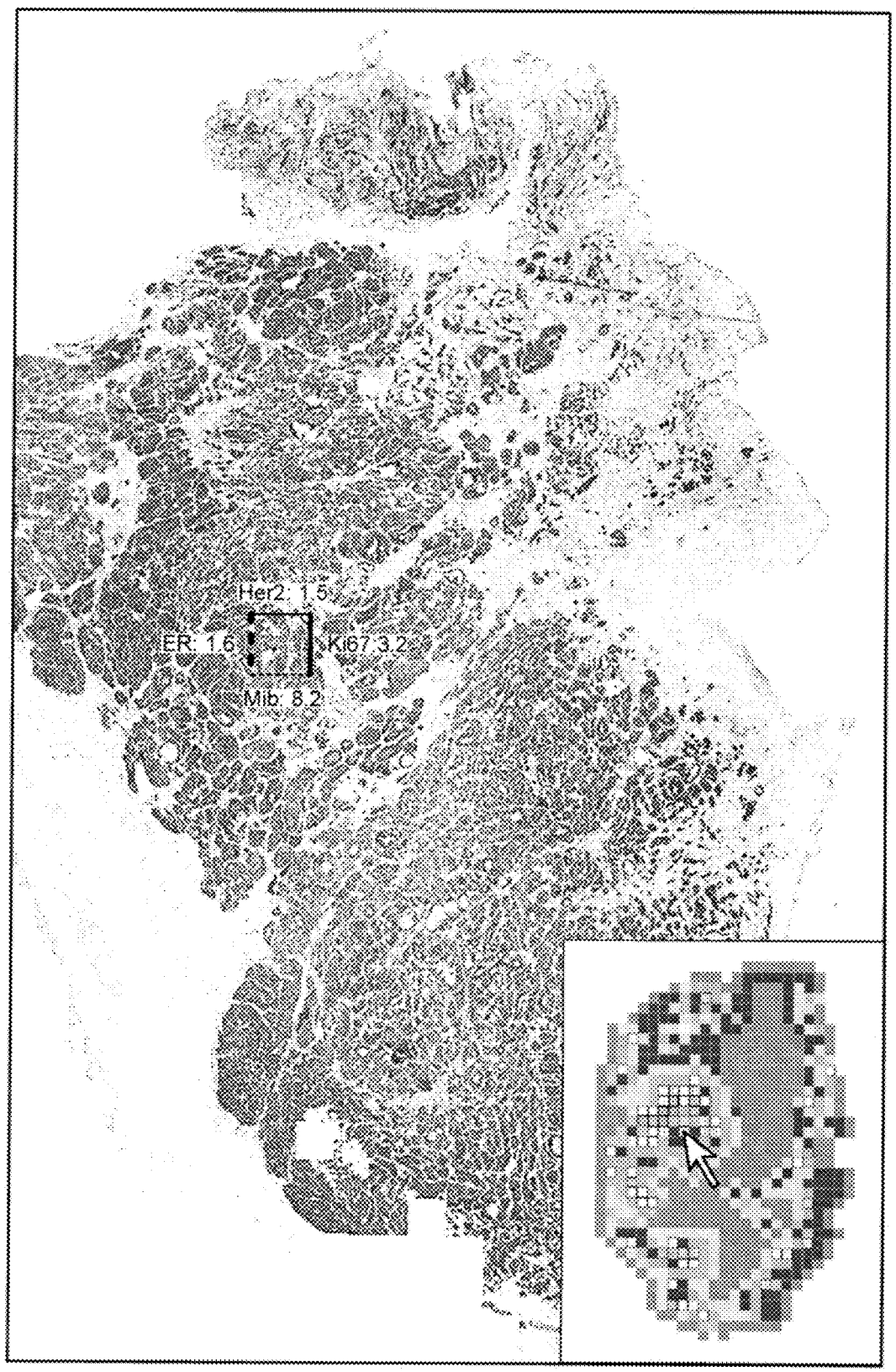
FIG. 15 is a screenshot of a graphical user interface displaying an image of a stained tissue slice and a combined hyperspectral image that combines the results of four other hyperspectral images.

FIG. 15 is a screenshot of the graphical user interface of the CNT system displaying a combined hyperspectral image with false-color encoding in the frame at the lower right of the screen. In the embodiment of FIG. 15, the combined hyperspectral image combines the results of four other hyperspectral images. The results of the four other hyperspectral images are obtained by performing image analysis on the images of four tissue slices each stained with a different biomarker. For each stained slice, measurements are then taken along the objects of the data network obtained from the image analysis. In the embodiment of FIG. 15, the four tissue slices are stained with estrogen receptor (ER) stain, Mib, tumor marker Ki67 and human Epidermal growth factor Receptor 2 (Her2). The pixel of the combined hyperspectral image in the frame at the lower right at the tip of the cursor arrow corresponds to the tile outlined in the full-resolution image of one of the stained slices. Each of four corners of the tile has a different color or pattern corresponding to a score value for one of the biomarkers. In this example, the scores for the four biomarkers are ER: 1.6, Mib 8.2, Ki67 3.2 and Her2: 1.5. As the cursor points to a different pixel of the combined hyperspectral image, the tile outline in the full-resolution image moves to the corresponding tile, and the biomarker score values change to reflect the results of the image analysis at the new location. The physician or clinician can navigate to the most critical tiles by looking for a particular color of pixels in the combined hyperspectral image.

Figure 16:
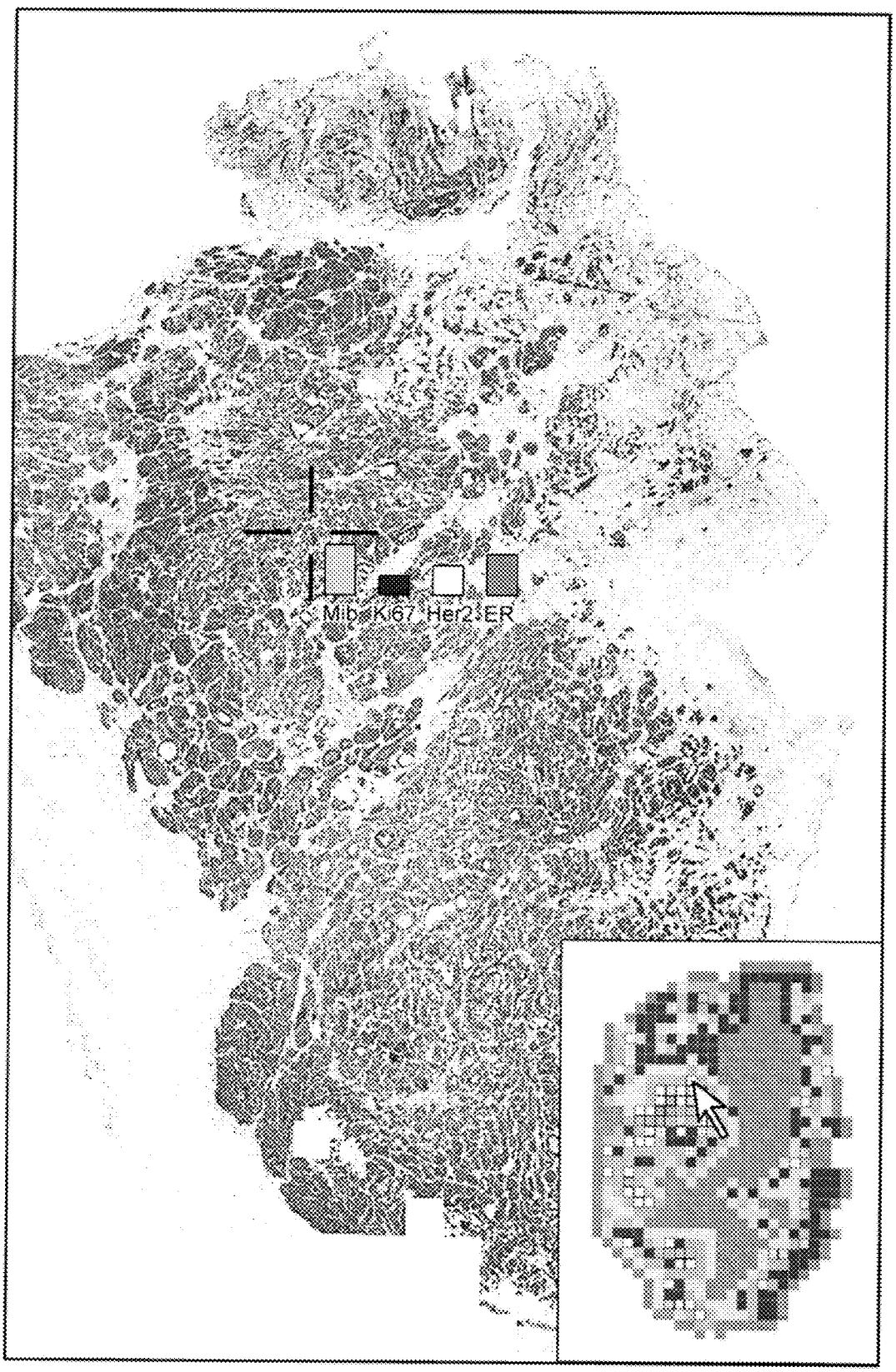
FIG. 16 is a screenshot displaying the combined hyperspectral image of FIG. 15 in which the square outline of a tile on the tissue slice in FIG. 15 has been replaced in by crosshairs centered over the middle of the tile.

FIG. 16 is a screenshot of the graphical user interface of the CNT system displaying the combined hyperspectral image together with a modified indicator of the tile and biomarker scores on the full-resolution image. The physician has navigated to a different pixel in FIG. 16. The square outline of the tile in FIG. 15 that corresponds to the hyperspectral pixel has been replaced in FIG. 16 by crosshairs centered over the middle of the tile. Instead of numerically listing the score values for the biomarkers, the magnitudes of the score values are represented by vertical bars.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) defining a first tile on a first digital image of a first slice of a tissue sample, wherein the first tile has a first position in the first digital image;
   (b) defining a second tile on a second digital image of a second slice of the tissue sample, wherein the second tile has a second position in the second digital image, and wherein the second slice originated from the tissue sample adjacent to the first slice;
   (c) calculating a first value associated with image objects detected in the first tile;
   (d) calculating a second value associated with image objects detected in the second tile;
   (e) generating a first hyperspectral image using the first digital image, wherein a first pixel of the first hyperspectral image has a first pixel value corresponding to the first value and a first pixel location corresponding to the first position;
   (f) generating a second hyperspectral image using the second digital image, wherein a second pixel of the second hyperspectral image has a second pixel value corresponding to the second value and a second pixel location corresponding to the second position;
   (g) generating a third hyperspectral image using the first hyperspectral image and the second hyperspectral image; and
   (h) displaying the third hyperspectral image on a computer monitor using a false-color encoding generated using the first pixel value and the second pixel value.

2. The method of claim 1, wherein the first slice is stained with a first biomarker, wherein the first value corresponds to a histopathological score of the first biomarker, wherein the second slice is stained with a second biomarker, and wherein the second value corresponds to a histopathological score of the second biomarker.

3. The method of claim 2, wherein the false-color encoding is based on a difference between the first value and the second value.

4. The method of claim 2, wherein the third hyperspectral image depicts a heterogeneity of a tumor in the tissue sample.

5. The method of claim 1, wherein the third hyperspectral image is generated in (g) by co-registering the first hyperspectral image with the second hyperspectral image.

6. The method of claim 1, further comprising:
   (i) generating an image object by segmenting the third hyperspectral image using an image analysis process.

7. The method of claim 6, further comprising:
   (j) determining a value of a property of the image object of the third hyperspectral image; and
   (k) storing the value of the property in a non-volatile memory.

8. The method of claim 1, wherein the first slice is stained with an H&E biomarker, and wherein the first value corresponds to a number of mitotic objects stained by the H&E biomarker.

9. The method of claim 1, wherein the second slice is immunohistochemically (IHC) stained, and wherein the second value corresponds to a first Allred score.

10. The method of claim 9, wherein the second slice is stained using an estrogen receptor antibody.

11. The method of claim 10, wherein the first slice is immunohistochemically (IHC) stained using a progesterone receptor antibody, and wherein the first value corresponds to a second Allred score.

12. The method of claim 1, wherein the second slice is processed with in-situ hybridization, and wherein the second value indicates gene amplification.

13. The method of claim 1, wherein the first value is calculated using a factor, and wherein the factor is taken from the group consisting of: a mean, a median, a minimum, a maximum, a quantile, and a standard deviation of a property of a subset of the image objects detected in the first tile.

14. The method of claim 13, wherein the first value is calculated also using the property of image objects detected in tiles adjacent to the first tile.

15. The method of claim 13, wherein the subset of the image objects detected in the first tile are those image objects classified as nuclei of tumor cells, and wherein the property is an intensity of staining of the subset of the image objects.

16. The method of claim 1, further comprising:
(i) selecting a pixel of the third hyperspectral image; and
(j) displaying on the computer monitor a tile of the first digital image that corresponds to the selected pixel of the third hyperspectral image.

17. The method of claim 1, further comprising:
(i) selecting the first tile of the first digital image; and
(j) displaying the first pixel value on the computer monitor.

18. The method of claim 17, wherein the first pixel value is displayed as part of a bar chart.

19. The method of claim 13, wherein the tissue sample is taken from a patient, further comprising:
(i) generating a therapy response for the patient based on the first value.

20. The method of claim 13, wherein the tissue sample is taken from a patient with cancer, further comprising:
(i) determining a probability of recurrence of the cancer based on the first value.

21. The method of claim 1, wherein the first value is calculated using a distance weighted mean of a property of a subset of the image objects detected in the first tile, and wherein the distance weighted mean is based on distances from a center of the first tile to a center of each of the image objects in the subset.

* * * * *